July 29, 1930.  E. M. JONES ET AL  1,771,791
ROLLING MILL BEARING
Filed March 14, 1928  3 Sheets-Sheet 1

Inventors
E. M. Jones,
C. A. Writer,
By
Attorney

WITNESSES:

July 29, 1930. E. M. JONES ET AL 1,771,791
ROLLING MILL BEARING
Filed March 14, 1928   3 Sheets-Sheet 2
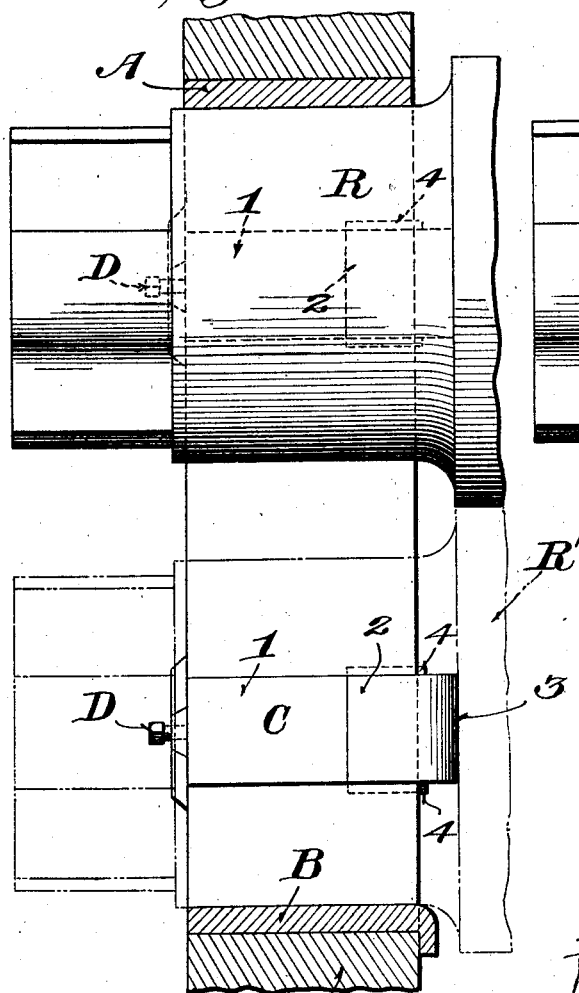
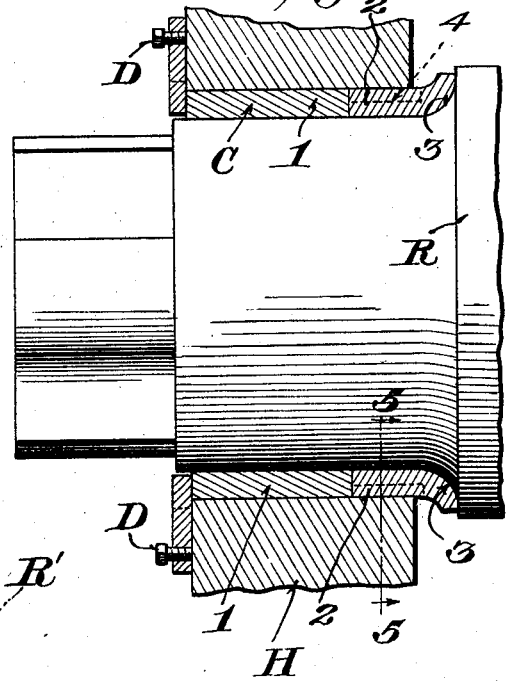
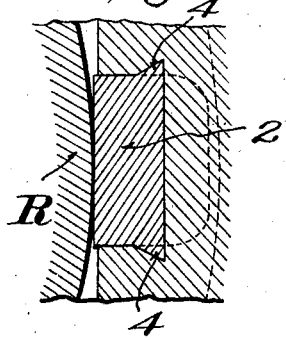
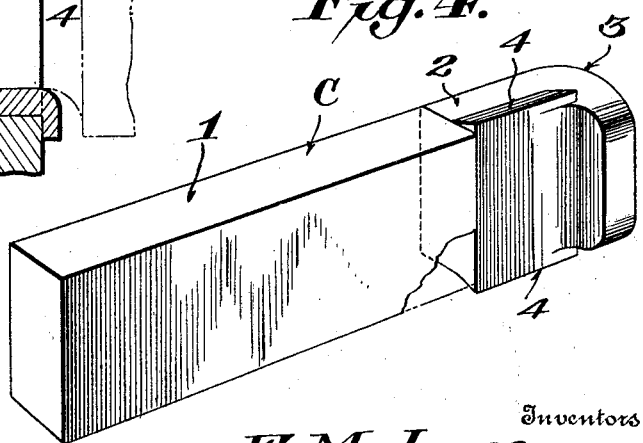
Inventors
E. M. Jones,
C. A. Writer,
Attorney July 29, 1930. E. M. JONES ET AL 1,771,791
ROLLING MILL BEARING
Filed March 14, 1928 3 Sheets-Sheet 3
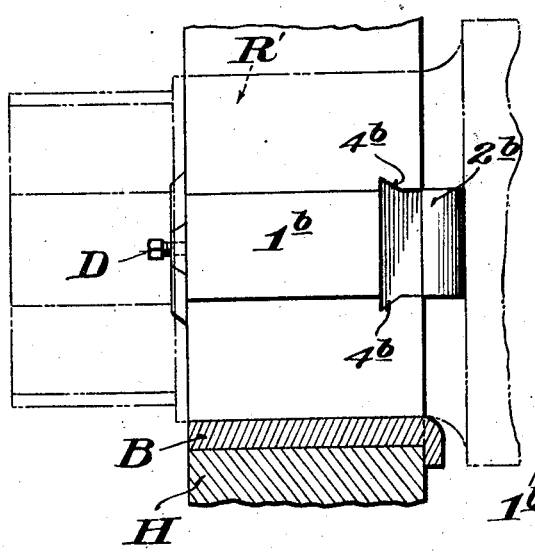
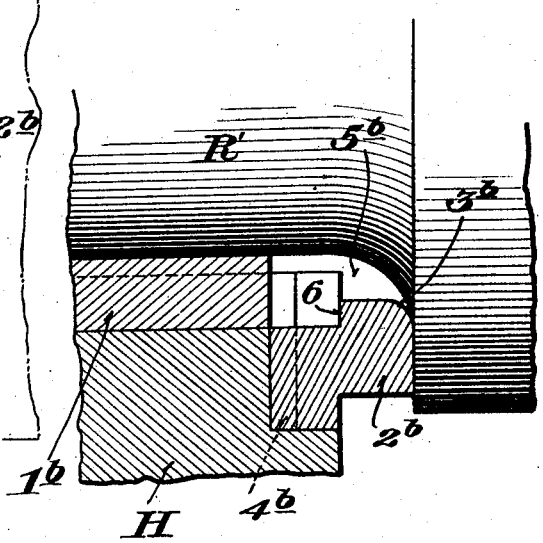
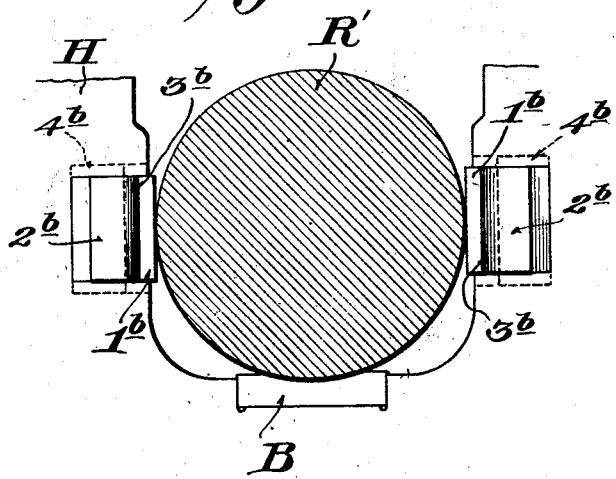
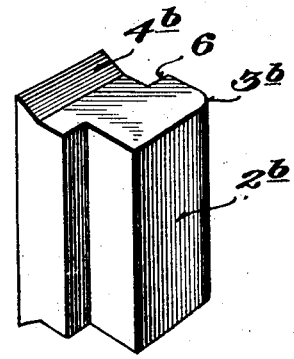
Inventors
E. M. Jones,
C. A. Writer, Patented July 29, 1930

1,771,791

UNITED STATES PATENT OFFICE

EVAN M. JONES AND CARL A. WRITER, OF ASHTABULA, OHIO, ASSIGNORS OF ONE-THIRD TO THE FALCON BRONZE COMPANY, OF YOUNGSTOWN, OHIO, A CORPORATION OF OHIO, ONE-THIRD TO SAID JONES, AND ONE-THIRD TO SAID WRITER

ROLLING-MILL BEARING

Application filed March 14, 1928. Serial No. 261,636.

This invention relates to bearings for rolling mills, and more particularly to a novel construction and practical arrangement of the bearings which results in great economy from the standpoint of operation and maintenance, both in the saving of material and the reduction of labor costs in effecting repeated renewals of the bearing elements.

Heretofore, in rolling mills for rolling tin plates or other metal sheets the top and bottom bearings were usually heavy brass castings having an inwardly extending portion which engaged directly with the fillet between the roll proper and the bearing or gudgeon with the result that such bearings have not only been subjected to high heat resulting from the friction of the roll neck engaging with the bearing, but also have been subjected to heat transmitted from the roll by conduction due to the bearing engaging directly in the fillet. The heat and friction thus resulting from the operation of the rolls has therefore caused considerable wear on the bearings, and lowered their physical properties and furthermore, by reason of the bearings engaging in the fillet of the rolls they are frequently cracked by the hammer action resulting from side thrust or endwise movement of the rolls, in combination with the blows resulting from the jump of the top roll when metal is inserted in the rolls. Accordingly, the present invention has in view a departure from the practice heretofore employed by providing a construction involving the use of novel side bearings which are smaller than the top and bottom bearings or brasses in the respect that they contain less metal. These side bearing members have portions that bear directly against the fillets of the rolls at opposite sides of the mill housing, while the top and bottom bearings are arranged so as to be entirely out of contact with the said fillets, thereby permitting the side bearings to take care of axial movement of the rolls or side thrust, "floating" as it is termed, while the top and bottom bearings merely engage with the roll necks thereby eliminating the possibility of the same being subjected to the side thrust or drift of the rolls, and preventing considerable conduction of heat from the hot roll surfaces to the bearings. By keeping the large top and bottom bearings from overheating, their efficiency is materially increased, and because they are not subject to the drift of the rolls they do not overheat and cracking does not result.

A primary object of the invention is, therefore, to provide a novel combination and arrangement of top, bottom and side bearing brasses wherein only the side brasses or bearings engage directly with the fillets of the rolls, thereby not only more effectively distributing the wear on more easily and readily renewable parts, but also, accomplishing the economies previously referred to, and requiring less lubrication.

A further object of the invention is to provide a novel side bearing unit including a body and renewable head which bears against the roll and, permits of making the head and body of the side brasses of different grades or alloys of metal.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Fig. 2 is a vertical sectional view of the construction shown in Fig. 1, the lower roll being shown in dotted lines to better illustrate one of the side brasses.

Fig. 3 is a horizontal cross-sectional view taken through opposite side brasses.

Fig. 4 is a detail perspective view of one of the side brasses.

Fig. 5 is a detail cross-sectional view on the line 5—5 of Fig. 3.

Fig. 8 is a side elevation similar to the lower half of Fig. 2, showing a modified form of toe.

Fig. 9 is a detail front elevation of a modification shown in Fig. 8.

Fig. 10 is a horizontal sectional view similar to Fig. 6 of the modified toe.

Fig. 11 is a detail perspective view of the toe shown in Figs. 8, 9 and 10.

Similar reference characters designate corresponding parts throughout the several figures of the drawings.

Figure 1:
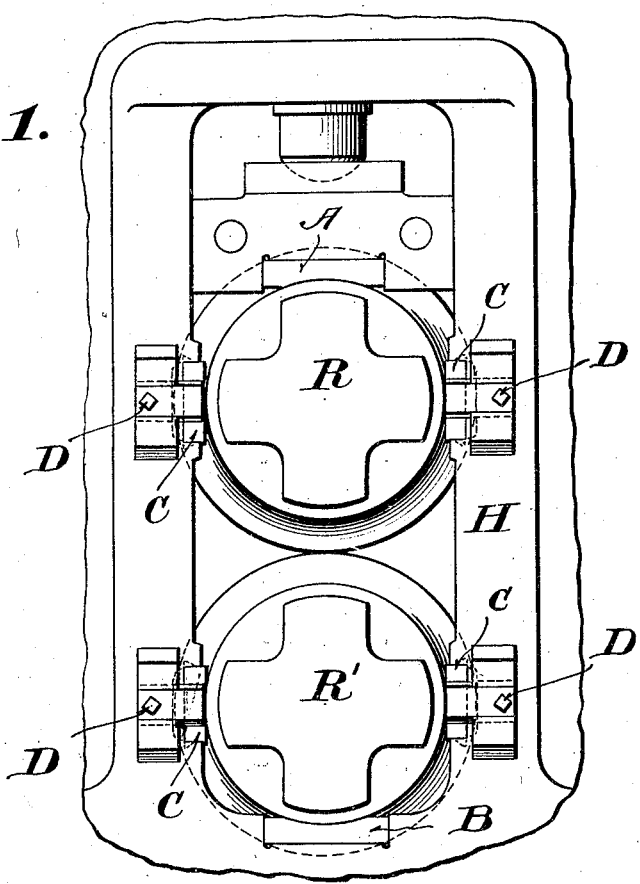
Figure 1 is an elevation of a portion of a rolling mill housing having the upper and lower rolls mounted therein in accordance with the present invention.

Referring to the drawings, it will be apparent that the present invention includes in its organization the top and bottom brasses or bearings A and B respectively for the gudgeons of the upper and lower rolls R and R', in combination with the side brasses designated generally as C and held in the opposite side walls of the mill housing H.

The top and bottom brasses A and B may be preferably of the standard type used for many years in mills of this type as indicated by the bearing B in Fig. 2, or as in the case of the top bearing A, the same may have the portion which formerly engaged with the fillet of the roll cut away. That is to say, since the present invention prevents contact between the fillets of the rolls and the top and bottom bearings A and B it is immaterial what type of top and bottom bearing is used. For example, a top or bottom bearing of the type of A in Fig. 2 having no fillet engaging portion may be used, or on the other hand, if the mill is equipped with top and bottom bearings having fillet engaging portions, the roll housings may be separated sufficiently to pull the fillets of the rolls out of engagement or contact with the fillet engaging portions of the bearings since the side bearings C are adapted and intended to be the only portions of the bearing contacting with the fillets of the rolls. The essential and distinctive feature of the invention, is, therefore, the use of the top and bottom brasses having bearing surfaces engaging only with the roll necks, while the side brasses engage directly with the fillets of the rolls as heretofore explained.

Referring more particularly to the side brasses or liners C, it will be observed that the same include a body portion 1 and a toe portion of lug 2 separate therefrom, the said toe 2 being provided with a roll fillet engaging surface 3 to bear directly against the roll fillet. As shown in Figs. 2 and 3, the renewable toe 2 of the unit is backed up by the body 1 in such a way as to cooperate with the fastenings D to maintain the unit in proper position with reference to the fillet of the roll. The opposite sides of the toe 2 are provided with offset keeper flanges or dove tails 4 for fitting in the undercut portions of the channels in the sides of the mill housing which holds the side bearings.

By making the side brasses C in two parts, the body 1 and toe 2 may be made of two distinct alloys, each built to give the best service under working conditions, and when a renewal is required, it will be necessary to only remove the toe 2 and replace it with a new one while the body 1 can remain in place.

Figure 6:
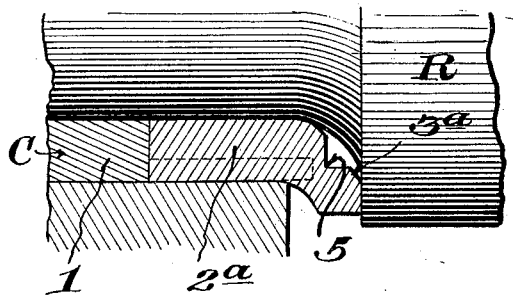
Fig. 6 is a detail sectional view illustrating the use of a modified form of head for the side brasses.
Figure 7:
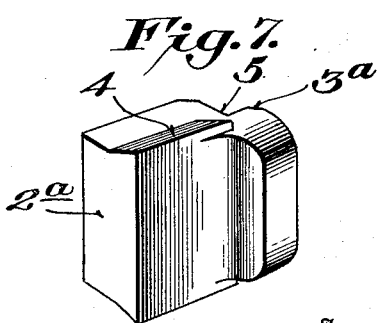
Fig. 7 is a detail perspective view of the modified form of head shown in Fig. 6.

In the type of head shown in Figs. 1 to 4 inclusive the fillet bearing surface 3 is continuous and unbroken, but as shown in Figs. 6 and 7 the bearing surface $3^a$ may be cut away or notched to provide a lubricant holding or receiving groove 5.

Figures 8 to 11 of the drawings illustrate a further carrying forward of the invention wherein the renewable toe $2^b$ is provided with the offset keeper flanges or dove tails $4^b$ adapted to fit in suitable channels arranged at right angles to the body $1^b$ of the side brass units C. In this form of the invention it is unnecessary for the side brass $1^b$ to fit up against the front end of the toe, as will be apparent from Fig. 10 because the roll engaging portion $3^b$ is in direct bearing engagement with the end of the roll and the roll fillet. In this arrangement the side brasses $1^b$ form a bearing for the roll necks, while the toe portions $2^b$ provide the bearings for the ends and fillets of the roll. The essential difference in this construction over that shown in Figs. 1 to 7 inclusive is that the toe portions $2^b$ are slid into the roll housing parallel to the inside face of the housing, and at right angles to the longitudinal axis of the rolls. This construction of toe is such that the front portion thereof provides a shoulder 6 (Fig. 10) which prevents the body $1^b$ of the side brass or the liner back of the side brass (if one used) from coming out against the fillet. Also this arrangement not only permits of the body coming out to engage the shoulder if desired, or remaining back in the housing as shown in Fig. 10, but also provides a recess $5^b$ which acts as a lubricant receiving channel.

From the foregoing it will be apparent that the present invention contemplates providing the roll housing H with the usual seat for the bottom brass B, while the top brass A is carried by the usual rider of the mill housing. These brasses, namely, A and B may be held in their seats by any suitable and convenient means available for that purpose, preferably well known as standard practice. The side walls or faces of the housing are, also, provided with seats for receiving the side brasses or liners C which have flat faces on the body portions 1 for engaging with the necks of the rolls while the toe 2 in its various form provides an abutment for engaging with the fillet of the adjacent roll for maintaining the same spaced away from the top and bottom brasses.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

We claim:—

1. A rolling mill bearing comprising in combination, top and bottom bearings engaging only with the roll necks, and side bearings each engaging both the roll neck and fillet.

2. A rolling mill bearing comprising in combination, top and bottom bearings engaging only with the roll necks, and side bearings each having a body and a toe portion engaging with both the roll neck and fillet.

3. In a rolling mill bearing, a side bearing including a renewable toe portion.

4. In a rolling mill bearing, a side bearing including a renewable toe portion engaging with both the roll neck and fillet of the roll.

5. In a rolling mill bearing, a side bearing including a body and a separate renewable toe portion engaging with the neck and fillet of the rolls.

6. A rolling mill bearing, comprising in combination, top and bottom brasses engaging only with the necks of the rolls, and side bearings for engaging with the necks and fillets of the rolls thereby to take up side thrust in the rolls and prevent the same from being transmitted to the top and bottom brasses.

7. A rolling mill bearing comprising in combination, top and bottom brasses engaging only with the necks of the rolls, and side bearings for taking the side thrust of the rolls, said side bearings each comprising a body and a separate renewable toe portion, the body engaging with the roll neck and the head engaging with the fillet.

8. A rolling mill bearing, comprising in combination, top and bottom brasses engaging only with the necks of the rolls, and side bearings for taking the side thrust of the rolls, said side bearings each comprising a separate body and toe portion made of different metal alloys.

9. A rolling mill bearing, including side bearings for taking the end thrust of the rolls, said side bearings each comprising a rectangular body and a separate renewable toe portion, said head portion having a rounded roll fillet engaging portion.

10. A rolling mill bearing, including side bearings each comprising a body and a separate renewable toe portion having a rounded roll fillet engaging surface and said surface being provided with a recess constituting a lubricant receiving channel.

11. A rolling mill bearing, including side bearings, each comprising a body and a separate renewable toe portion, and means on the sides of the toe portion for interlocking with the roll housing.

12. A rolling mill bearing, including side bearings, each comprising a body adapted to be positioned parallel with the neck of the roll, and a renewable toe adapted for contact with the end and fillet of the roll thereby to take up side thrust in the rolls.

13. A rolling mill bearing including a housing having channels for side brasses and also having channels at right angles to the said channels for receiving the said side brasses, brasses for engaging the roll necks fitting in said first mentioned channels, and renewable toe bearings fitting in the last mentioned channels.

14. A bearing for rolls, comprising in combination with a roll housing having therein recesses forming side and bottom bearing seats, and a rider therein having a recess forming a top bearing seat, of top and bottom bearing brasses received within the top bearing seat of the rider and the bottom bearing seat of the housing respectively, and having their inner ends spaced away from the fillets of the rolls, and flat faced side liners mounted in the side seats of the housings, each of said liners having a member forming a stop for limiting the extent of lengthwise shifting movement of the adjacent roll.

15. A bearing for rolls, comprising, in combination with a roll housing having therein recesses forming side and bottom bearing seats, and a rider having therein a recess forming a top bearing seat, of top and bottom bearing brasses received within the top bearing seat of the rider and the bottom bearing seat of the housing respectively, and having their inner ends wholly out of contact with the rolls, and liners mounted in the side seats of the housings, each of said liners being formed with a portion for abutting an end of the adjacent roll for maintaining the latter spaced away from said top and bottom brasses.

16. A bearing for rolls, comprising, in combination with a roll housing having therein recesses forming side and bottom bearing seats and a rider therein having a recess forming a top bearing seat, of top and bottom bearing brasses received within the top bearing seat of the rider and the bottom bearing seat of the housing, respectively, and having their inner ends wholly out of contact with the rolls, and liners mounted in the side seats of the housings, each of said liners having an inner end lug adapted to be abutted by an end of the adjacent roll and whereby endwise shifting of said roll is limited to the extent that contact of the end and fillet of the latter with said brasses is prevented.

17. A bearing for rolls, comprising, in combination with a roll housing having therein recesses forming side and bottom bearing seats, and a rider having therein a recess forming a top bearing seat, of top and bottom bearing brasses received within the top bearing seat of the rider and the bottom bearing seat of the housing, respectively, and having their inner ends wholly out of contact with the rolls, and liners mounted in the side seats of the housings, each of said liners having an inner end lug adapted to be abutted by an end of the adjacent roll and whereby endwise shifting of said roll is limited to the extent that contact of the end and fillet of the latter with said brasses is prevented, each liner having the surface thereof which confronts the fillet of its roll shaped to prevent contact with the fillet.

18. In a rolling mill, the combination with top and bottom brasses out of contact with the rolls, and side liners in contact with the rolls.

19. In a rolling mill, the combination with top and bottom brasses out of contact with the rolls, and side liners having removable toe portions adapted to contact with the rolls.

20. The combination with a roll housing and roll journaled therein, of the usual bearing brasses mounted in said housing and adapted to receive load thrust from said roll in a direction transverse to the longitudinal axis of said roll, said bearing brasses being terminated materially short of the body portion of said roll so as to be free from end thrust, and a hard metal wear surface separate from said brasses projecting from the inner side face of said housing at a point within the boundary of the end face of the body of said roll and adapted to be engaged by said end face of said roll, said hard metal wear surface being adapted to take the end thrust of said roll.

21. In a rolling mill, housings and rolls having necks provided with fillets, a bearing for the end of the roll including an end thrust block located between a housing and the adjacent end of a roll and having an inner face spaced from said fillet, means to removably connect said block to the housing whereby upon axial shifting for a short distance of the roll away from the block said means can be disengaged from the housing and the block then bodily removed, a side brass independent of said block and engaged therewith at one end, and means removably connected to the housing and engaged with the opposite end of the side brass whereby upon removal of said last named means the side brass can be removed without disturbing the block.

22. In a rolling mill, housings and rolls having necks provided with fillets, a bearing for the end of the roll including an end thrust block located between a housing and the adjacent end of a roll and having an inner face spaced from said fillet, means to removably connect said block to the housing whereby upon axial shifting for a short distance of the roll away from the block said means can be disengaged from the housing and the block then bodily removed, a side brass independent of said block, and means removably connected to the housing for holding said side brass against axial movement and upon removal enabling the side brass to be removed without disturbing the block.

23. The combination with a roll housing and a roll journaled therein, of bearing brasses mounted in said housing, said bearing brasses being terminated materially short of the body portion of said roll so as to be free from end thrust, and a metal wear block separate from said brasses projecting from the inner side face of said housing at a point within the boundary of the end face of the body of said roll and adapted to be engaged by said end face of said roll, said metal wear block being adapted to take the end thrust of said roll.

In testimony whereof we hereunto affix our signatures.

EVAN M. JONES.
CARL A. WRITER.